Figure 1:
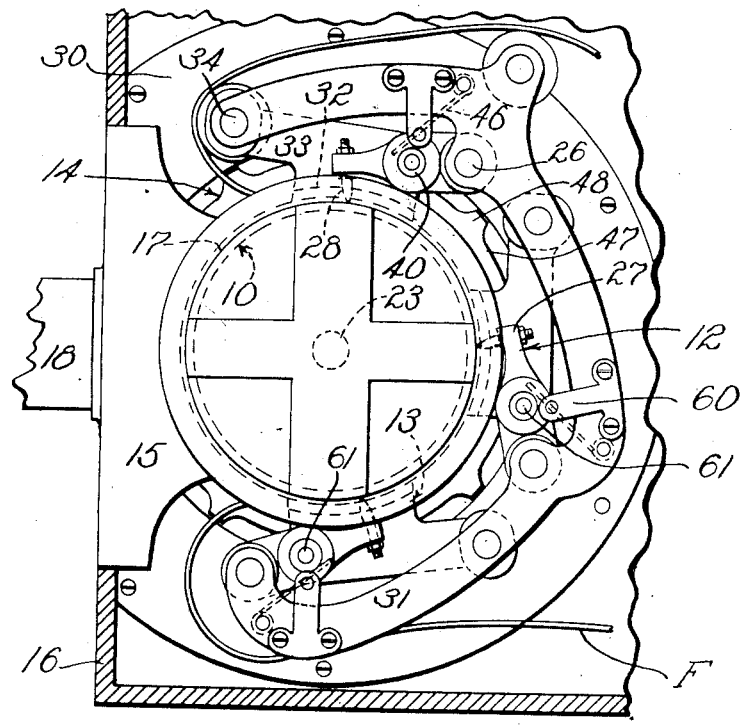

April 17, 1934.    W. L. WRIGHT    1,955,160
FILM HANDLING MECHANISM
Filed Jan. 14, 1931    2 Sheets-Sheet 1

Inventor
Walter L. Wright
By
His Attorney

April 17, 1934.  W. L. WRIGHT  1,955,160
FILM HANDLING MECHANISM
Filed Jan. 14, 1931  2 Sheets-Sheet 2
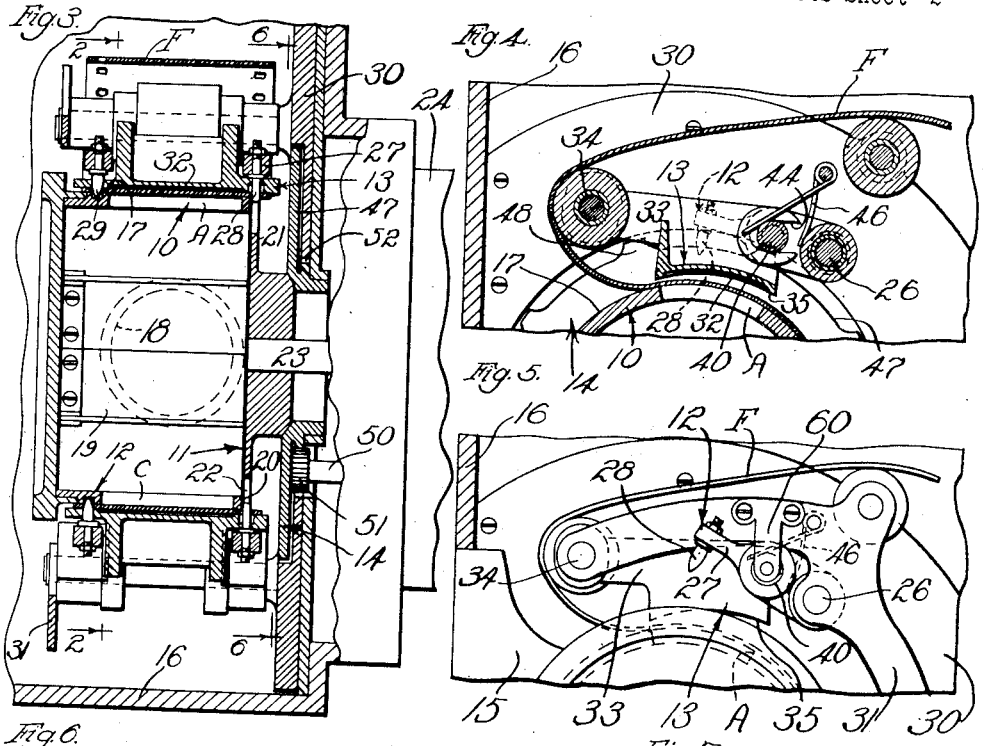
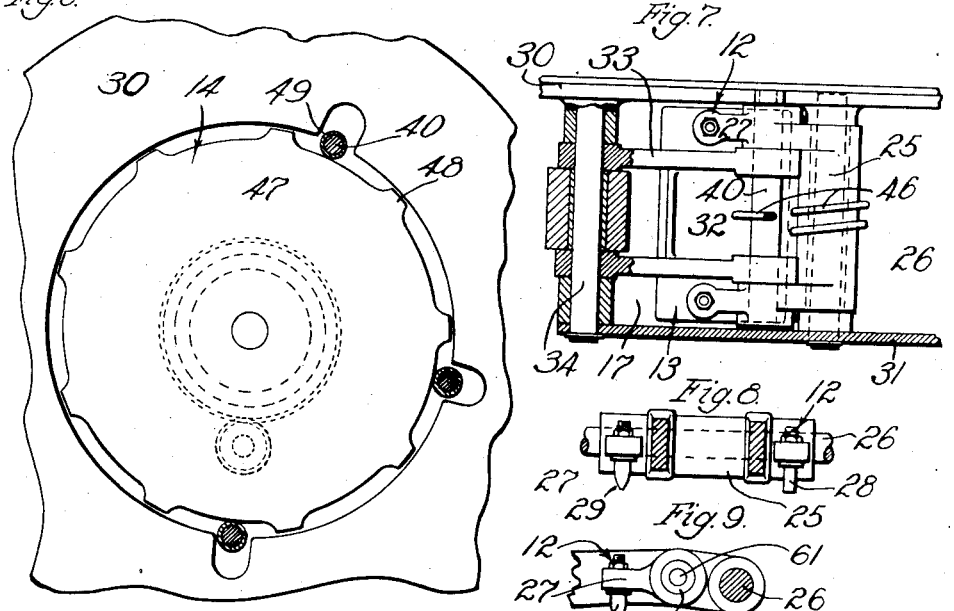
Inventor
Walter L. Wright
By
His Attorney Patented Apr. 17, 1934

1,955,160

UNITED STATES PATENT OFFICE 1,955,160

FILM HANDLING MECHANISM

Walter L. Wright, Santa Monica, Calif., assignor to Synchrome Corporation, Los Angeles County, Calif., a corporation of California Application January 14, 1931, Serial No. 508,639

13 Claims. (Cl. 88—16.4)

This invention relates to a film handling mechanism, and has particular reference to a mechanism useful in cameras, and the like.

In certain photographic processes, for instance, in the production of color motion pictures, it is desired to definitely locate and set a plurality of spaced parts of a film in order to obtain a plurality of definitely-located exposures simultaneously on a film. This cannot be accomplished with ordinary film-handling mechanisms because of variations which occur in film due to shrinkage and expansion.

It is an object of the present invention to provide a mechanism that will accurately locate and effectively hold a plurality of spaced parts of a film. The positioning of the film by the mechanism of my present invention is not affected by variations in the film due to shrinkage or expansion.

It is another object of the invention to provide a mechanism in which the film is carried freely by the advancing means, so that free parts or slight loops may occur between the held parts when the mechanism operates to hold the film in set position.

Another object of the invention is to provide a simple, effective, and improved combination of film-piloting means and film-clamping means. In the mechanism provided by this invention, the film-piloting means and clamping means are interconnected to operate in proper time relation, the mechanism being extremely simple, effective, and dependable.

Another object of the invention is to provide a film-handling mechanism including film-piloting means and film clamping means having a single or common operating means.

It is a further object of the invention to provide a mechanism of the character just mentioned in which the film-piloting means and film-clamping means are operated by a single cam.

A further object of the present invention is to provide an effective and novel combination of film-advancing means and film-piloting means. In the mechanism of the invention, the film-advancing means and the film-piloting means are both effective and dependable in their action on the film and do not in any way interfere with or impair each other's action.

Other objects and features of my invention will be best and more fully understood from the following detailed description of a typical form and application of the invention, throughout which description reference is had to the accompanying drawings, in which:—

Figure 2:
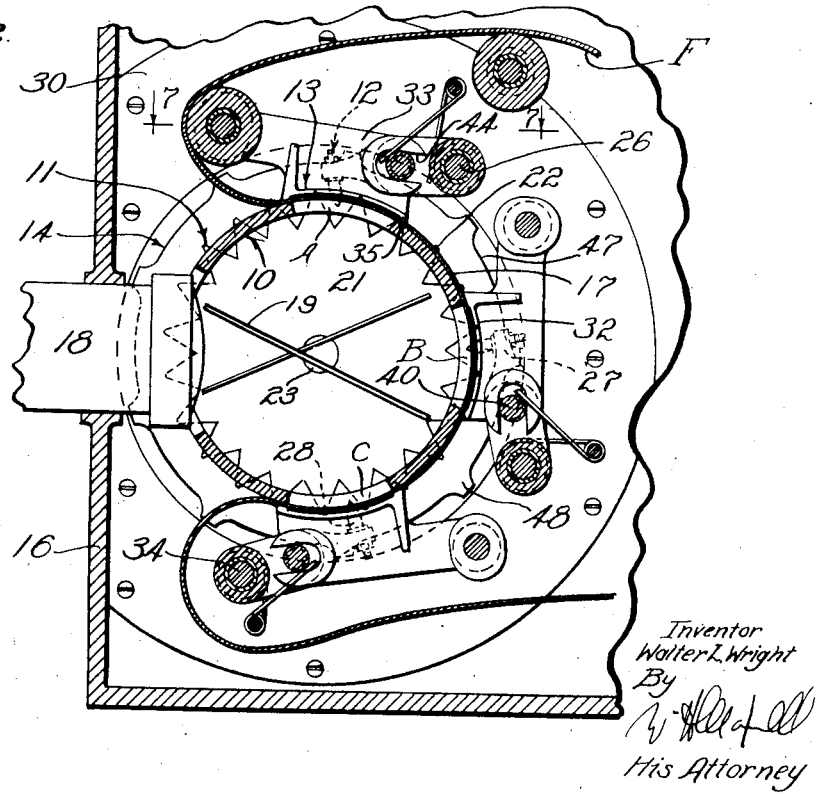

Fig. 1 is a side elevation of the mechanism provided by the invention showing the parts in position where the film is piloted and clamped in position. Fig. 2 is a sectional view of the mechanism, being a section taken substantially on line 2—2 on Fig. 3 and showing the parts positioned as shown in Fig. 1. Fig. 3 is a transverse sectional view taken through the pilot pins at two of the apertures and showing the parts in the position illustrated in Figs. 1 and 2. Fig. 4 is a detailed view of a portion of the parts shown in Fig. 2 showing the parts operated so that the film is free to be advanced. Fig. 5 is a view showing a portion of the mechanism latched out of operation. Fig. 6 is a view illustrating the cam of the mechanism, being a view taken substantially on line 6—6 on Fig. 3. Fig. 7 is a view taken substantially as indicated by line 7—7 on Fig. 2, and Figs. 8 and 9 are views illustrating the pilot pins of the mechanism.

The mechanism provided by this invention is intended primarily to handle a length of film so that it is intermittently advanced and, when not in motion, is definitely positioned at a plurality of spaced points and is clamped or held firmly at said points. The mechanism is applicable, generally, to film-handling mechanisms, however, it is particularly useful as applied to a camera and, therefore, I will proceed with a detailed description of the invention embodied in a camera mechanism.

The mechanism includes, generally, an aperture plate 10, means 11 for advancing a film F with reference to the aperture plate 10, pilot means 12 for definitely locating or positioning spaced parts of the film at the apertures of the plate 10, clamp means 13 at the apertures of the plate 10 for clamping or holding the film at the apertures after it has been positioned by the pilot means 12, operating means 14 for the pilot means and clamp means, and various other parts the details and functions of which will be hereinafter set forth.

The aperture plate 10 is mounted stationary in the camera case 16, for instance, it may be held by a flange 15 projecting from a wall of the case. The plate 10 has a face 17 over which a length of film is adapted to operate, and has a plurality of longitudinally-spaced apertures A, B, and C. In the form of the invention illustrated, the aperture plate 10 is curved about a center. The face 17 over which the film operates is the outer side or face of the plate. In the particular case illustrated, the film F is adapted to be exposed to light projected outwardly through the apertures A, B, and C. For purpose of example, I have illustrated an optical system in connection with the mechanism, the system including a lens device 18 through which light enters the space within the aperture plate, and crossed light dividers 19 within the aperture plate which operate to allow a shaft of light to pass through them and through the aperture B onto the film F and operate to reflect off shafts of light to pass through the apertures A and C to fall on the film F.

It is to be understood that the present invention is concerned primarily with the film-handling mechanism and that various optical systems may be employed in connection with the mechanism.

In the construction illustrated one edge of the aperture plate 10 is connected with the flange 15, while the other edge 20 is free and terminates so that the perforated margin portion of the film overhangs or projects beyond the plate. This arrangement is clearly illustrated in Fig. 3 of the drawings.

The film-advancing means 11 is designed to engage the film and to be operated to intermittently advance the film with reference to the aperture plate 10. In accordance with the preferred form of the invention, the film-advancing means engages the film throughout a substantial portion of its length, in fact, throughout the film-carrying portion of the aperture plate. The film-advancing means may be in the form of a single sprocket wheel 21 mounted concentric with the aperture plate and having film-engaging teeth 22 operating adjacent the edge 20 of the aperture plate to engage perforations in the overhanging margin of the film F. The sprocket wheel 21 is adapted to be operated intermittently by any suitable movement mechanism. In the drawings the sprocket wheel is shown mounted on the shaft 23 of a movement mechanism, which mechanism may be contained in a housing 24 within the camera case 16. In accordance with the present invention, the teeth 22 of the sprocket wheel 21 project beyond the face 17 of the aperture plate, in order to engage the film F, and are spaced to engage spaced perforations in the film. In the preferred arrangement, the teeth 22 are spaced to engage every other perforation of the film. Further, in accordance with my invention, the teeth 22 are designed and proportioned so that they fit freely in the perforations of the film, thus allowing the film to be effectively positioned by the pilot means 12.

The pilot means 12 operates to definitely position the parts of the film at the apertures A, B, and C. The means 12 includes, generally, pilot pins for engaging and positioning the film at the apertures, and carriers for the pilot pins. In the preferred form of the invention, I provide two pilot pins at each aperture, one to engage each margin of the film. The two pilot pins at each aperture may be supported by a single carrier 25 pivotally supported on a fixed shaft 26. In the design illustrated, each carrier 25 has two arms 27 which carry the pilot pins 28 and 29.

The pilot pins 28 and 29 are designed to position the film at an aperture both laterally and longitudinally. In practice, both pilot pins may be designed to engage the film to position it in both directions, or one pin may be designed to position the film in one direction and the other pin designed to position the film in the other direction. In the case illustrated, the pin 28 is designed to position the film longitudinally, while the pin 29 is designed to position the film longitudinally and also laterally. To position the film only longitudinally, the pin 28 is designed to engage only the ends of a film perforation. The pin 29, being designed to position the film in both directions, is shaped to engage the ends and also the sides of a film perforation. It will be observed from the drawings that the fixed shafts 26, on which the pilot pin carriers are mounted, are located so that the pilot pins occur at about the centers of the apertures in the plate 10 and may be moved into and out of engagement with the film by slight oscillation of the carriers.

The shafts 26, which support the pilot pin carriers 25, may be held between a partition or fixed part 30 in the camera case 16, and a frame member 31.

The clamping means 13 engages the film F at the aperture plates after the film has been positioned by the pilot pins, so that the film is held firmly during the interval of exposure. The means 13 includes a film-clamping plate 32 at each aperture in the plate 10. The plates 32 are designed to clamp the film to the face 19 of the aperture plate around the apertures in the plate. The plates are mounted for movement into and out of clamping engagement with the film. For instance, in the case illustrated, each plate is carried by arms 33 pivotally supported on a fixed shaft 34. The shafts 34 extend between the part 30 in the camera case and the frame 31. The clamping faces or margins 35 of the plates 32 are curved concentric with the face 17 of the aperture plate and the mountings of the plates are such that the plates 32, when actuated as shown in Figs. 1, 2, and 3 of the drawings, fit and clamp the film tightly against the face 17 of the aperture plate.

The pilot pins and clamp plate at each aperture in the plate 10 are interconnected to operate so that the pilot pins immediately precede the clamp plate in engaging the film F. Further, in the preferred form of the invention, the operating means 14 is preferably a single or common operating means acting to operate both the pilot means and clamping means. In the construction illustrated, a rod 40 is carried by each pilot pin carrier so that it is located intermediate the ends of the arms 27, extends parallel with the mounting shaft 26 of the carrier, and projects from one side of the carrier to form a cam follower.

The clamp means at each aperture is related to the pilot pins at the aperture through engagement of the arms 33 carrying the clamp plate with the rod 40 in connection with the pin carrier. The mounting shafts 26 and 34 are located or related so that the pin carrier and clamp plate at each aperture project toward each other and overlap the ends of the arms 33 carrying the plate 32, being yoked to form openings 44 which receive the rod 40. The parts just referred to are clearly illustrated in Figs. 1, 4, 5, and 7 from which figures it will be apparent that these parts are proportioned so that the pilot pins engage the film to position it with reference to the aperture just before the clamp plate reaches the film to clamp it to the aperture plate.

The operating means for the parts just described include springs 46 engaging the rods 40 to normally yieldably urge them in a direction, so that the pilot pins and clamp means operatively engage the film F, and a single cam 47 rotatably mounted concentric with the aperture plate and provided with projections 48 to cooperate with the parts of the rods which form cam followers. The rods 40 project from the pilot pin carriers into the path of the projections 48, the projecting parts of the rods carrying rollers 49 which are engaged by the projections 48. As the cam 47 revolves, projections 48 engage the rods of the several pilot pin carriers to operate the pilot pin carriers and the arms carrying the clamp plates 32, so that the film F is released at all points simultaneously. During the period that the pilot pins and clamp plates are released from the film through the cooperation of the projections 48 and the cam followers, the film-advancing sprocket operates to advance the film with reference to the aperture plate. It will be obvious how the cam 47 may be operated to drive in definite time relation with reference to the movement or film-advancing sprocket 21. In the case illustrated, the cam is shown driven from a constantly rotating shaft 50, coming from the movement mechanism 24, through a pinion 51 on the shaft 50, and a gear 52 formed on the cam. It will be obvious that the shaft 50 may be suitably geared with the intermittently-moving shaft 23 by mechanism within the housing 24 of the movement mechanism. It is also to be understood that in the case of a camera a suitable shutter is provided, which shutter is timed with reference to the other parts, so that light is cut off when the film is in motion.

In the construction illustrated, spring catches 60 are carried by the frame 31 to engage sockets 61 in the ends of the rods 40 when it is desired to hold the pilot pins and clamp plates in position away from the film. These catches are provided so that the mechanism can be readily set in position so that the film can be threaded into the mechanism. It is also to be noted that the parts above described are related or synchronized so that the pilot pins engage perforations in the film occurring between the teeth 22 of the film-advancing sprocket.

From the foregoing description it will be obvious how the mechanism handles a film to intermittently advance it with reference to the aperture plate and when it is at rest causes it to be definitely positioned at the several apertures, and then clamped firmly in set position. In accordance with the invention, the parts are designed so that the film is more or less loose when the advancing movement is completed, so that it is free to be centered or definitely positioned by the pilot pins. By designing the teeth of the advancing sprocket so that they fit perforations in the film with clearance, the film is allowed freedom or looseness, so that it can be definitely positioned by the pilot pins.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A film-handling mechanism including, a plate in which a film may operate, the plate being curved about a center and having a plurality of apertures, a film-advancing sprocket for engaging a film at the several apertures to intermittently advance it, the sprocket being substantially concentric with the plate, and means for positioning and holding the film at the apertures, the teeth of the sprocket being proportioned and related to the perforations of the film so that the film is free to loop between the apertures.

2. A film-handling mechanism including, a plate having a plurality of apertures, a film-advancing sprocket having teeth for cooperating with perforations in a film at the several apertures to intermittently advance it, and means for positioning and holding the film at the apertures, the teeth of the sprocket being shaped and proportioned so that the cooperation of the teeth with the perforations in the film is such that the film is free to loop between the apertures, the last-mentioned means including pins engaging the film to position spaced parts of the film at the apertures and clamps for holding the positioned film parts at the apertures.

3. A film-handling mechanism including, a plate having a plurality of apertures, a film-advancing sprocket having teeth for cooperating with perforations in a film at the plate to intermittently advance it, the teeth of the sprocket being spaced to engage spaced perforations of the film, and means for positioning and holding the film at the apertures, the teeth of the sprocket being shaped and proportioned so that the cooperation of the teeth with perforations is such that the film is free to loop between the apertures, the last-mentioned means including pins engaging the film to position spaced parts of the film at the apertures and clamps for holding the positioned film parts at the apertures, the said pins engaging perforations in the film between those engaged by the teeth of the sprocket.

4. A film-handling mechanism including, a plate having a surface curved about a center and over which the film operates and having a plurality of apertures, a single film-advancing sprocket substantially concentric with the said surface for engaging a film at the several apertures to intermittently advance it, and means for positioning and holding the film at the apertures, the teeth of the sprocket being shaped and proportioned with relation to the perforations of the film to have free engagement with the perforations so that the film is free to loop between the apertures.

5. A film-handling mechanism including, a plate having a plurality of apertures, a film-advancing sprocket having teeth for engaging perforations in the film at the apertures to intermittently advance it, the said teeth being spaced to engage spaced perforations, and means for positioning and holding the film at the apertures including a pilot pin at each aperture to engage and position the film, a clamp plate at each aperture to clamp the film, and means interconnecting the pilot pin and clamp plate so that the pilot pin operates ahead of the clamp plate, the said pins engaging perforations in the film between those engaged by the teeth of the sprocket.

6. A film-handling mechanism including, a plate having a plurality of apertures, a film-advancing means for engaging the film at the several apertures to intermittently advance it, and means for positioning and holding the film at the apertures including a pilot pin at each aperture to engage and position the film, a clamp plate at each aperture to clamp the film, means interconnecting the pilot pin and clamp plate so that the pilot pin operates ahead of the clamp plate, and a cam operating the pilot pin and clamp plate.

7. A film-handling mechanism including, a curved film guiding plate having a plurality of apertures and supporting a film with one of its perforated margins projecting beyond one edge of the plate, a film-advancing sprocket concentric with the plate and adjacent said edge of the plate to engage the film, the teeth of the sprocket being spaced to engage spaced perforations of the film and fitting loosely into the perforations of the film, pilot pins engaging the film at the perforations between the teeth of the sprocket, and clamp plates operating to clamp the film following operation of the pins.

8. A film-handling mechanism including, a curved film guiding plate having a plurality of apertures and supporting a film with one of its perforated margins projecting beyond one edge of the plate, a film-advancing sprocket concentric with the plate and adjacent said edge of the plate to engage the film, the teeth of the sprocket being spaced to engage spaced perforations of the film and fitting loosely into the perforations of the film, pilot pins engaging the film at the perforations between the teeth of the sprocket, the pilot pins engaging the film to position it longitudinally and laterally.

9. A film-handling mechanism including, a plate having a plurality of apertures, film-advancing means for engaging the film at the plate to intermittently advance it, and means for positioning and holding the film at the apertures including a pilot pin at each aperture to engage and position the film, a clamp plate at each aperture to clamp the film, interconnected pivotal mountings for the pin and plate, means normally yieldingly urging the pin and clamp plate into engagement with the film, and a cam operable to move the pin and clamp plate out of film engagement.

10. A film-handling mechanism including, a plate having a plurality of apertures, film-advancing means for engaging the film at the plate to intermittently advance it, and means for positioning and holding the film at the apertures including a pilot pin at each aperture to engage and position the film, a clamp plate at each aperture to clamp the film, interconnected pivotal mountings for the pin and plate, a spring acting through the mountings to normally yieldingly urge the pin and clamp plate into engagement with the film, and a cam operable to move the pin and clamp plate out of film engagement.

11. A film-handling mechanism including, a plate having a plurality of apertures, film-advancing means for engaging the film at the plate to intermittently advance it, and means for positioning and holding the film at the apertures including a pilot pin at each aperture to engage and position the film, a clamp plate at each aperture to clamp the film, interconnected pivotal mountings for the pin and plate, means normally yieldingly urging the pin and clamp plate into engagement with the film, and a cam engaging one of the mountings to move the pin and clamp plate out of film engagement.

12. A film handling mechanism including, a plate having a plurality of apertures, a single sprocket for engaging a film at the apertures to intermittently advance the film along the plate, the film engaging teeth of the sprocket being shaped and proportioned with relation to the perforations of the film so that the film is free to loop between the apertures, and means for positioning and holding the film at the apertures, the said means including pilot pins engaging the film to position spaced parts of the film at the apertures, clamps for engaging the positioned parts of the film, and a single operating means for the pins and clamps.

13. A film handling mechanism including, a plate having a plurality of apertures, a single sprocket for engaging a film at the apertures to intermittently advance the film along the plate, the film engaging teeth of the sprocket being shaped and proportioned with relation to the perforations of the film so that the film is free to loop between the apertures, and means for positioning and holding the film at the apertures, the said means including pilot pins engaging the film to position spaced parts of the film at the apertures, clamps for engaging the positioned parts of the film, and a single cam operating the pins and clamps.

WALTER L. WRIGHT.